United States Patent
Kruglick

(10) Patent No.: US 9,549,036 B2
(45) Date of Patent: Jan. 17, 2017

(54) NETWORK INJECTED STORAGE REDIRECTION FOR EMBEDDED APPLICATIONS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 219 days.

(21) Appl. No.: 14/376,133

(22) PCT Filed: Nov. 20, 2013

(86) PCT No.: PCT/US2013/070980
§ 371 (c)(1),
(2) Date: Jul. 31, 2014

(87) PCT Pub. No.: WO2015/076794
PCT Pub. Date: May 28, 2015

(65) Prior Publication Data
US 2016/0080515 A1    Mar. 17, 2016

(51) Int. Cl.
G06F 9/445 (2006.01)
H04L 29/08 (2006.01)
G06F 3/06 (2006.01)

(52) U.S. Cl.
CPC ......... *H04L 67/2819* (2013.01); *G06F 3/0604* (2013.01); *G06F 3/0607* (2013.01);
(Continued)

(58) Field of Classification Search
USPC ............ 717/174, 175, 169; 455/3.06, 414.1; 707/784, 692; 713/1; 709/203
See application file for complete search history.

(56) References Cited

U.S. PATENT DOCUMENTS

2003/0041323 A1* 2/2003 Plummer ................. G06F 8/65
717/169
2010/0011351 A1* 1/2010 Tsvi ...................... G06F 3/0607
717/174
(Continued)

OTHER PUBLICATIONS

"'Intelligent' embedded devices will be driven by Java, say analysts," Accessed at http://web.archive.org/web/20130922064602/http://jaxenter.com/intelligent-embedded-devices-will-be-driven-by-java-say-analysts-45593.html, Accessed on Jul. 28, 2014, pp. 3.
(Continued)

*Primary Examiner* — Kyung H Shin
(74) *Attorney, Agent, or Firm* — Turk IP Law, LLC

(57) ABSTRACT

Technologies are generally described to redirect local storage for embedded applications. In some examples, a computing device such as a redirection router, coupled to network-attached storage, may detect a request for an application being delivered from a server to a destination device such as a ubicomp device and intercept the requested application. The redirection router may determine whether the destination device has sufficient local storage. In response to determination that the destination device does not have sufficient local storage or a predefined configuration such as requesting device being configured for local storage, a reference to the client-side storage associated with the application may be replaced with a link, to the network-attached storage prior to delivery of the application. Subsequent retrievals of the application or portions thereof may be from the network-attached storage directly or via the redirection router.

15 Claims, 6 Drawing Sheets

(52) U.S. Cl.
CPC .......... *G06F 9/44505* (2013.01); *H04L 67/08* (2013.01); *H04L 67/2804* (2013.01); *H04L 67/1095* (2013.01); *H04L 67/2847* (2013.01)

(56) References Cited

U.S. PATENT DOCUMENTS

| | | | | |
|---|---|---|---|---|
| 2010/0248699 | A1* | 9/2010 | Dumais | H04L 67/1095 455/414.1 |
| 2012/0011160 | A1* | 1/2012 | Rauhala | H04L 67/06 707/784 |
| 2012/0221841 | A1* | 8/2012 | Adams | G06F 1/24 713/1 |
| 2012/0289147 | A1* | 11/2012 | Raleigh | H04L 67/2847 455/3.06 |
| 2013/0204849 | A1* | 8/2013 | Chacko | G06F 3/0604 707/692 |

OTHER PUBLICATIONS

"1st International Workshop on Exploiting Context Histories in Smart Environments," Accessed at http://web.archive.org/web/20070815190238/http://www.pervasive.ifi.lmu.de/workshops/w8/, Accessed on Jul. 28, 2014, pp. 2.
"ASP GetFile Method," Accessed at http://web.archive.org/web/20130815064313/http://www.w3schools.com/asp/met_getfile.asp, Accessed on Jul. 28, 2014, pp. 2.
"Chromecast," Accessed at http://web.archive.org/web/20130727214835/http://www.google.com/intl/us/chrome/devices, Accessed on Jul. 28, 2014, pp. 2.
"Cox Home Security," Accessed at http://web.archive.org/web/20140627220715/http://cox.com/residential/home-security.cox, Accessed on Jul. 28, 2014, pp. 3.
"Designing an M2M Platform for the Connected World," Beecham Research, Research Report, pp. 1-12 (2012).
"Get rXg!," Accessed at http://rgnets.com/, Accessed on Jul. 28, 2014, pp. 6.
"Jazelle—arm architecture extensions for Java applications," Accessed at http://web.archive.org/web/20140728065124/http://cadal.cse.nsysu.edu.tw/seminar/seminar_file/sywang_0917.pdf, Accessed on Jul. 28, 2014, pp. 6.
"Minecraft: Pi Edition—video demo and more details," Accessed at http://web.archive.org/web/20131030200755/http://www.raspberrypi.org/archives/2603, Accessed on Jul. 28, 2014, pp. 17.
"Real-time Low-power Java TM Processor: aJ-100," Ajile Systems Data Sheet, pp. 4 (2000).
"Shop iPad," Accessed at http://web.archive.org/web/20131123000518/http://store.apple.com/us/buy-ipad/ipad-air, Accessed on Jul. 28, 2014, pp. 4.
"TradeMe/bootup.js," Accessed at https://github.com/TradeMe/bootup.js, Accessed on Jul. 28, 2014, pp. 4.
"Turn an Old Computer into a Networked Backup, Streaming, or Torrenting Machine with NAS4Free," Accessed at http://web.archive.org/web/20131119100443/http://lifehacker.com/5822590/turn-an-old-computer-into-a-networked-backup-streaming-or-torrenting-machine-with-freenas, Accessed on Jul. 28, 2014, pp. 7.
"Two Million!," Accessed at http://web.archive.org/web/20131119042233/http://www.raspberrypi.org/, Accessed on Jul. 28, pp. 13.
Biggs, J., "Now You Know: Hotels Inject Banner Ads Into the Wi-Fi They Charge You For," posted on Apr. 6, 2012, Accessed at http://web.archive.org/web/20131103193446/http://techcrunch.com/2012/04/06/now-you-know-hotels-inject-banner-ads-into-the-wi-fi-they-charge-you-for, Accessed Jul. 28, 2014, pp. 12.
Culler, D., et al., "A Network-centric Approach to Embedded Software for Tiny Devices," In Embedded Software, vol. 2211, pp. 114-130 (2001).
Fingas, J., "GreenWave Reality ships WiFi-aware light bulbs that flick on through motion and smartphones," posted on Oct. 22, 2012, Accessed at http://web.archive.org/web/20131115055057/http://www.engadget.com/2012/10/22/greenwave-reality-ships-wifi-light-bulbs/, Accessed on Jul. 28, 2014, pp. 2.
Hardin, D., "Real-Time Objects on the Bare Metal: An Efficient Hardware Realization of the JavaTM Virtual Machine," in Proceedings of the Fourth International Symposium on Object-Oriented Real-Time Distributed Computing, pp. 53-59 (2001).
Hilwa, A., "Ghost in the Machine: Java for Embedded Development," IDC, White Paper, Sep. 2012, pp. 1-12.
International Search Report and Written Opinion in counterpart International Patent Application No. PCT/US2013/70980, mailed May 15, 2014.
Kimpe, D. et al., "Integrated In-System Storage Architecture for High Performance Computing," Proceedings of the 2nd International Workshop on Runtime and Operating Systems for Supercomputers, Article No. 4, pp. 6 (2012).
Kreuzinger, J. et al., "Real-time event-handling and scheduling on a multithreaded Java microcontroller," Microprocessors and Microsystems, vol. 27, No. 1, pp. 19-31 (2003).
Schöberl, M., "JOP: A Java Optimized Processor for Embedded Real-Time Systems," University of Technology Vienna,Austria, Accessed at http://web.archive.org/web/20140728061750/http://www.ciss.dk/download/Slides%20Martin%20Schoeberl.pdf, Accessed on Jul. 28, 2014, pp. 34.
Schoeberl, M. "Evaluation of a Java Processor," Accessed at http://citeseerx.ist.psu.edu/viewdoc/download?doi=10.1.1.67.6099&rep=rep1&type=pdf, Accessed on Jul. 28, 2014, pp. 8.
Weiser, M., "Some Computer Science Issues in Ubiquitous Computing," Commun. ACM, vol. 36, No. 7, pp. 75-84, (1993).

\* cited by examiner

NETWORK INJECTED STORAGE REDIRECTION FOR EMBEDDED APPLICATIONS

CROSS-REFERENCE TO RELATED APPLICATION

This Application is the U.S. National Stage filing under 35 U.S.C. §371 of PCT Application Ser. No. PCT/US13/70980 filed on Nov. 20, 2013. The PCT application is hereby incorporated by reference in its entirety.

BACKGROUND

Unless otherwise indicated herein, the materials described in this section are not prior art to the claims in this application and are not admitted to be prior art by inclusion in this section.

As ubiquitous computing (ubicomp) is implemented in devices with fewer and fewer resources, such as appliances and light bulbs, local storage may be one of the components lacking in such devices. Even modest amounts of nonvolatile storage on ubicomp devices may cost as much as major features, such as high-definition multimedia interface (HDMI) video capabilities and full Linux processing capabilities. Consequently, manufacturers may add major features to the devices instead of expensive nonvolatile storage. Moreover, if storage is added, pricing options of devices may be often expressed largely in memory upgrade levels of the storage.

While lack of local storage may reduce cost, any time a power of a device is interrupted or a system resets, the device may need to re-download application(s) executed on the device. The application(s) may be critical for distributed ubicomp systems, such as personal health monitoring and security, where each device reports activities using installed agents or monitors. Additionally, embedded applications, which may generally be delivered from a service and reside to some degree on local storage, may cause start up delay if the local embedding has to be re-downloaded through an external network such as the internet for each application activation. The repeated re-downloading may further congest the network(s) on which the application resides. While collaborative caching has been applied in research environments to enable devices with limited local storage to utilize network based storage, such implementations involve substantial computation power, state tracking, network access management, and comparable features.

SUMMARY

The present disclosure generally describes techniques to redirect local storage for embedded applications.

According to some examples, methods are provided to redirect local storage for embedded applications. An example method may include one or more of detecting a delivery of an application from a server, intercepting the delivery of the application, and replacing a reference to the client-side storage associated with the application with a network-attached storage link in response to a determination that one or more devices intended to receive the application do not have sufficient local storage. The method may also include delivering the application with the replaced reference to the one or more devices.

According to other examples, a computing device to redirect local storage for embedded applications is described. An example computing device may include a memory and a processor coupled to the memory. The processor may detect a delivery of an application from a server, intercept the delivery of the application, replace a reference to the client-side storage associated with the application with a network-attached storage link in response to a determination that one or more devices intended to receive the application do not have sufficient local storage, and deliver the application with the replaced reference to the one or more devices.

According to further examples, systems to redirect local storage for embedded applications are described. An example system may include a server coupled to one or more devices configured to deliver an application and/or a content to the devices, and a redirection router. The redirection router may detect a delivery of an application from a server, intercept the delivery of the application, replace a reference to the client-side storage associated with the application with a network-attached storage link in response to a determination that one or more devices intended to receive the application do not have sufficient local storage, and deliver the application with the replaced reference to the one or more devices.

According to some embodiments, a computer-readable memory device with instructions stored thereon is described, which when executed on one or more computing devices may execute a method to redirect local storage for embedded applications. The method may be similar to the methods provided above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
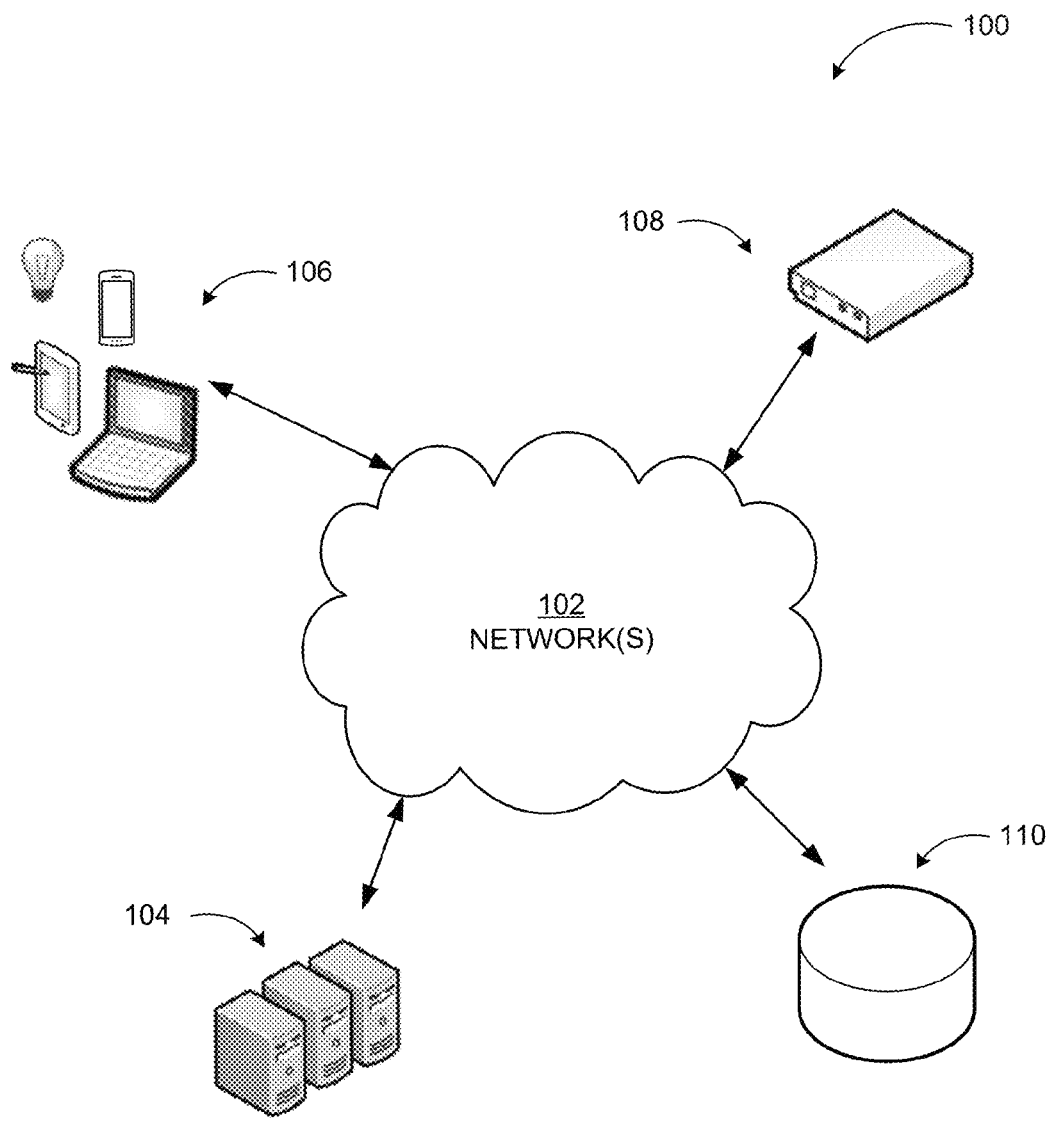
FIG. 1 illustrates an example network environment in which a system to redirect local storage for embedded applications may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein, it will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to local storage redirection for embedded applications.

Briefly stated, technologies are generally described to redirect local storage for embedded applications. In sonic examples, a computing device such as a redirection router, coupled to network-attached storage, may detect a request for an application being delivered from a server to a destination device such as a ubicomp device and intercept the requested application. The redirection router may determine whether the destination device has sufficient local storage. In response to determination that the destination device does not have sufficient local storage or a predefined configuration such as requesting device being configured for local storage, a reference to the client-side storage associated with the application may be replaced with a link to the network-attached storage prior to delivery of the application. Subsequent retrievals of the application or portions thereof may be from the network-attached storage directly or via the redirection router.

FIG. 1 illustrates an example network environment in which a system to redirect local storage for embedded applications may be implemented, arranged in accordance with at least some embodiments described herein.

As shown in a diagram 100, an example system may be implemented in a network 102 including one or more servers 104, one or more devices 106, and a computing device 108 coupled to network-attached storage 110. The computing device 108 may be a router as shown in FIG. 1, a server, a gateway, a client device, or other similar computing device configured to manage local storage for delivered applications for the devices 106. The network 102 may comprise any topology of servers, clients, Internet service providers, and communication media, where the topology may be static or dynamic. The network 102 may include secure networks such as an enterprise network, an unsecure network such as a wireless open network, or the Internet. The network 102 may also coordinate communication over other networks such as Public Switched Telephone Network (PSTN) or cellular networks. Furthermore, the network 102 may include short range wireless networks such as Bluetooth or similar ones. By way of example, and not limitation, the network 102 may include wireless media such as acoustic, radio frequency (RF), infrared and other wireless media.

The servers 104, coupled to the devices 106 by a user, one or more settings, and/or a default action, may deliver an application to one or more of the devices 106. The devices 106 may include a laptop, a tablet, a smart phone, a television, an appliance, a thermostat, a light bulb, or other similar devices. The devices 106 may be associated with a home, a business, an enterprise, or other similar location. The application may be previously coded to enable one or more commands for local storage. For example, HTML commands such as setItem and getItem may be coded in the application. Furthermore, one or more portions of the application may be coded such that the portions of the application may be delivered from the servers 104 and/or locally stored separately. The portions of the application may include objects, libraries, executables, and the like.

The computing device 108 may detect a request for the application being delivered from the servers 104 and intercept the requested application. The computing device may determine whether the devices 106 intended to receive the application from the application server have sufficient local storage available. If the devices 106 do not have sufficient storage capacity, they may have to download the application (or portions of the application) from the servers 104 each time they want to execute the application generating potentially excessive network traffic. The computing device may alternately look up an identified type of device 106 to ascertain its capabilities such as local storage.

Sufficient storage may be defined as a particular amount of storage and/or nonvolatile memory that enables a device to store one or more portions of an application without having to re-download the portions of the application upon start-up of the device and/or activation of the application. The computing device 108 may determine whether the devices 106 have sufficient local storage using various methods. The computing device 108 may have prior knowledge of capabilities of the devices 106, based on advertised identifications and services, enabling reference of a catalog or a table displaying the advertised identifications and services of the devices 106. If the computing device 108 does not have knowledge of the capabilities of the devices 106, the computing device 108 may observe the devices 106 during multiple application downloads to determine whether the devices re-download application content including a request for local storage. Furthermore, the computing device 108 may reset an application session to observe whether application content of the devices 106 has to re-download.

Upon determination that the devices 106 have sufficient local storage available to store the one or more portions of the application, the portions of the application may be delivered to the devices 106, according to one embodiment. For example, the laptop may have sufficient local storage available to locally store one or more portions of the application. According to another embodiment, upon determination that the devices 106 do not have sufficient local storage available, a reference to the client-side storage associated with the application may be replaced with a network-attached storage link maintained by the computing device 108. The application with the replaced reference may then be delivered to the devices 106. For example, devices with fewer resources, such as the thermostat, the appliance, or the light bulb, may not have to sufficient local storage available to locally store one or more portions of the application. Once the devices 106 receive the application with the replaced reference, the devices 106 may recognize replaced link to the network-attached storage 110. For example, the one or more commands for local storage coded within the application may be directed to the network-attached storage link that replaced the reference. As a result, for subsequent downloads of the application requested by the devices 106, the one or more commands may be directed to the network-attached storage 110 through the network-attached storage link.

In yet other examples, a device receiving the application may have sufficient local storage, but the link to client-side storage of the application may still be replaced with local network-attached storage reference(s) to reduce excessive network usage, latency, and similar performance metrics.

The network-attached storage 110 may store one or more portions of the application in response to a request from the computing device 108 to store the portions of the application. The network-attached storage 110 may further be capable of serving out the portions of the application in response to a request from the computing device 108 and/or the devices 106 to retrieve the portions of the application stored in the network-attached storage 110. The portions of the application may be directly retrieved from the network-attached storage 110 by the devices 106 through the network-attached storage link. The network-attached storage link may also represent an injected API call to a file store or other network storage access procedure that is independent of a redirection router. For example the link 212 may be a file reference to an operating system networked drive, or an active piece of code that composes and sends an API call over the network to a storage device and delivers the returned package as the stored data, or as a general discovery broadcast to see if any network device has the file in a storage, and so on. In some embodiments, no network connection to the computing device 108 may be needed for the devices 106 to retrieve the portions of the application after the initial retrieval of the application from the servers 104.

In other examples, the computing device 108 may act as a local storage manager. Upon detecting a subsequent request for the application or portions of the application from the devices 106 with the replaced storage links, the computing device 108 may retrieve the portions of the application from the network-attached storage 110 and provide to the devices 106 without involving the servers 104.

If different portions of the application are stored at different network-attached storage places, the commands to retrieve those portions (replaced with links to the respective network-attached storage locations) may automatically direct the requests to the correct locations without a redirection router or another device (or database) keeping track of where each portion of the application is stored locally.

Figure 2:
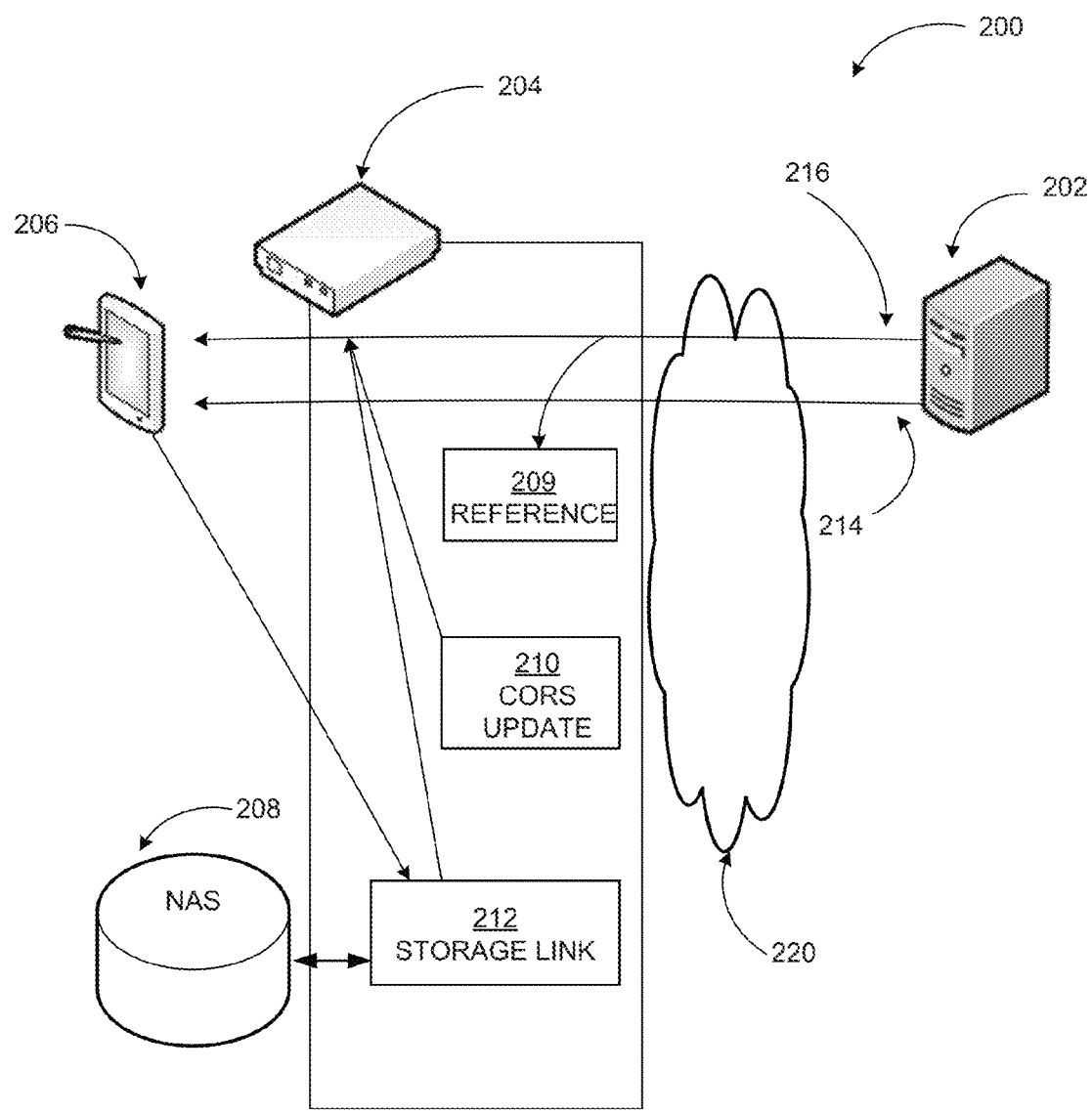
FIG. 2 illustrates an example system to redirect local storage for embedded applications.

FIG. 2 illustrates an example system to redirect local storage for embedded applications, arranged in accordance with at least some embodiments described herein.

As shown in a diagram 200, the example system may include a server 202, a computing device (e.g., redirection router 204), a device (e.g., tablet 206), and network-attached storage 208 within a network 220. The redirection router 204 may be a home router, an Internet Service Provider (ISP) router, a company router, or an enterprise router.

The server 202 may be coupled to the tablet 206, the server configured to deliver an application 216 and/or a content 214 to the tablet 206. The application 216 may be previously coded to include one or more commands for storage of different application portions. For example, HTML commands such as setItem and getItem may be coded in the application. Furthermore, one or more portions of the application may be coded such that the portions of the application may be delivered from the server 202 and/or locally stored separately. The portions of the application may include objects, libraries, executables, and the like.

The redirection router 204 may detect a request for the application 216 being delivered and may intercept the application 216. The redirection router 204 may determine whether the tablet has sufficient local storage available to store one or more portions of the application without having to re-download the portions of the application upon start-up of the tablet 206 and/or activation of the application 216. Upon determination that the tablet 206 does not have sufficient local storage available, the redirection router 204 may remove a reference 209 to the client-side storage associated with the application 216 and replace the reference 209 with a network-attached storage link 212 (which is considered local). The reference 209 may be removed using an application service provider (ASP) method that returns a file object from a path, the references including local storage code. The redirection router 204 may modify the path with the network-attached storage link 212, where the network-attached storage link 212 may be a soft link or a hard link maintained by the redirection router 204 that is directed to the network-attached storage 208, the link 212 may also represent an injected API call to a file store or other network storage access procedure that is independent of redirection router 204. For example the link 212 may be a file reference to an operating system networked drive, or an active piece of code that composes and sends an API call over the network to a storage device and delivers the returned package as the stored data, or as a general discovery broadcast to see if any network device has the file in a storage, and so on. The network-attached storage link 212 may also be modified by a user to specify a device, the device representing the network-attached storage 208, for the redirection router 204 to redirect local storage of the application. For example, the user may want personal applications to be locally stored on the user's personal laptop and applications used for work to be locally stored on the user's work laptop. The redirection router 204 may further inject the application 216 with a cross origin resource sharing (CORS) update 210 and then deliver the application with the replaced reference to the tablet 206. The CORS update 210 may inform the application 216 and application session that the application can use content from the net-work-attached storage link 212 in addition to content from the server 202.

In further embodiments, a getItem command (an example of the reference 209) may be replaced upon delivery with the network-attached storage link 212, and the redirection router 204 may retrieve the application from local network-attached storage and provide to the tablet 206 acting as local storage manager. Retrieval and delivery of the portions of the application may be transparent to the tablet 206 and to the server 202 in some examples.

The network-attached storage 208 may be a device capable of storing one or more portions of the application 216 in response to a request from the redirection router 204 or device 206 to store the portions of the application 216. The network-attached storage 208 may further be capable of serving out the portions of the application 216 in response to a request from the device executing the application or the redirection router 204 to retrieve the one or more portions of the application 216 stored in the network-attached storage. For example, the network-attached storage 208 may be a laptop that has sufficient local storage available to store the portions of the application 216 for the tablet 206. The network-attached storage 208 may also inform the redirection router 204 about the amount of storage available on the device. Once the device representing the network-attached storage 208 has no more storage space available to store additional portions of applications, the redirection router may no longer replace references to client-side storage with a network-attached storage link directed to the device. Instead, another device may be used as network-attached storage.

Furthermore, if the network-attached storage link 212 is a soft link, at least a portion of the application stored at the network-attached storage 208 may be duplicated and stored at one or more other devices proximal to the network-attached storage 208. For example, at least a portion of the application stored on the laptop mentioned in the previous example may be duplicated and stored subsequently on a smart phone, a television, or another similar device, proximal to and on the same network 220 as the laptop and the soft link may be served from any of these points, for example in response to a network file request performed by the soft link.

As discussed above, once the application with the replaced reference has been initially downloaded, the redirection router 204 may not be needed to retrieve the one or more portions of the application 216 stored in the network-attached storage 208. Instead, the portions of the application 216 may be directly serviced out from the network-attached storage 208 and retrieved by the tablet 206 through the network-attached storage link. The network-attached storage 208 does not need to be connected to the network to service out the portions of the application 216, which may avoid congesting the network 220, so that service may be delivered efficiently with less data usage.

In one example, a redirection router may be configured to replace a reference to client-side storage associated with an application with a network-attached storage link directed to a laptop, the laptop representing the network-attached storage. The redirection router may then deliver the application with the replaced reference to one or more devices, such as a smart phone. When a user initially downloads the application with the replaced reference on the smart phone, the one or more commands associated with a portion of the application, such as the libraries of the application, may be configured to be directed to the network-attached storage link, enabling the libraries of the application to be stored on the laptop through the network-attached storage link. In an example scenario, a user may be traveling in the back of a taxi with the laptop and the smart phone, which may be linked by Bluetooth. Upon activating the application on the smartphone, the one or more commands, for example, the storage link that replaced the original getItem command may direct the smart phone to retrieve the libraries of the application from the laptop, enabling the libraries of the application to run on the smartphone even though neither the smart phone nor the laptop are connected to a wider network and redirection router 204 is not present.

Commonly, redirection routers may be implemented to present login pages representing a facility and broker payments before allowing access and may also be capable of injecting advertising into the web pages people receive. Such systems may be capable of parsing web pages being delivered to users and, in the case of advertising, doing keyword searches, picking specific domains, and injecting added code to deliver advertising to generate revenue for a facility. These capabilities, specifically local rendering, evaluation, and injection, may be sufficient to enable the implementation of this solution. As a result, the redirection router may need only a subset of these capabilities to partially parse the delivered applications and inject the network-attached storage link and CORS update.

As previously discussed, the redirection router 204 may be a home router, an Internet Service Provider (ISP) router, a company router, and an enterprise router. For example, modern security systems may often include field devices, such as a motion detectors or a door sensor, coupled to a monitoring center of the security company. Security companies that want to deploy additional features onto the field devices may implement embodiments at the regional level or on their central coordinator node in a household.

Implementing the embodiments, the redirection router 204 may be able to provide simulated local storage for as many devices as desired with transparency to the devices (e.g., the tablet 206) and the server 202. Subsequently, the network-attached storage may be able to provide virtual storage for dozens of devices that do not have network state or storage connection capability.

Figure 3:
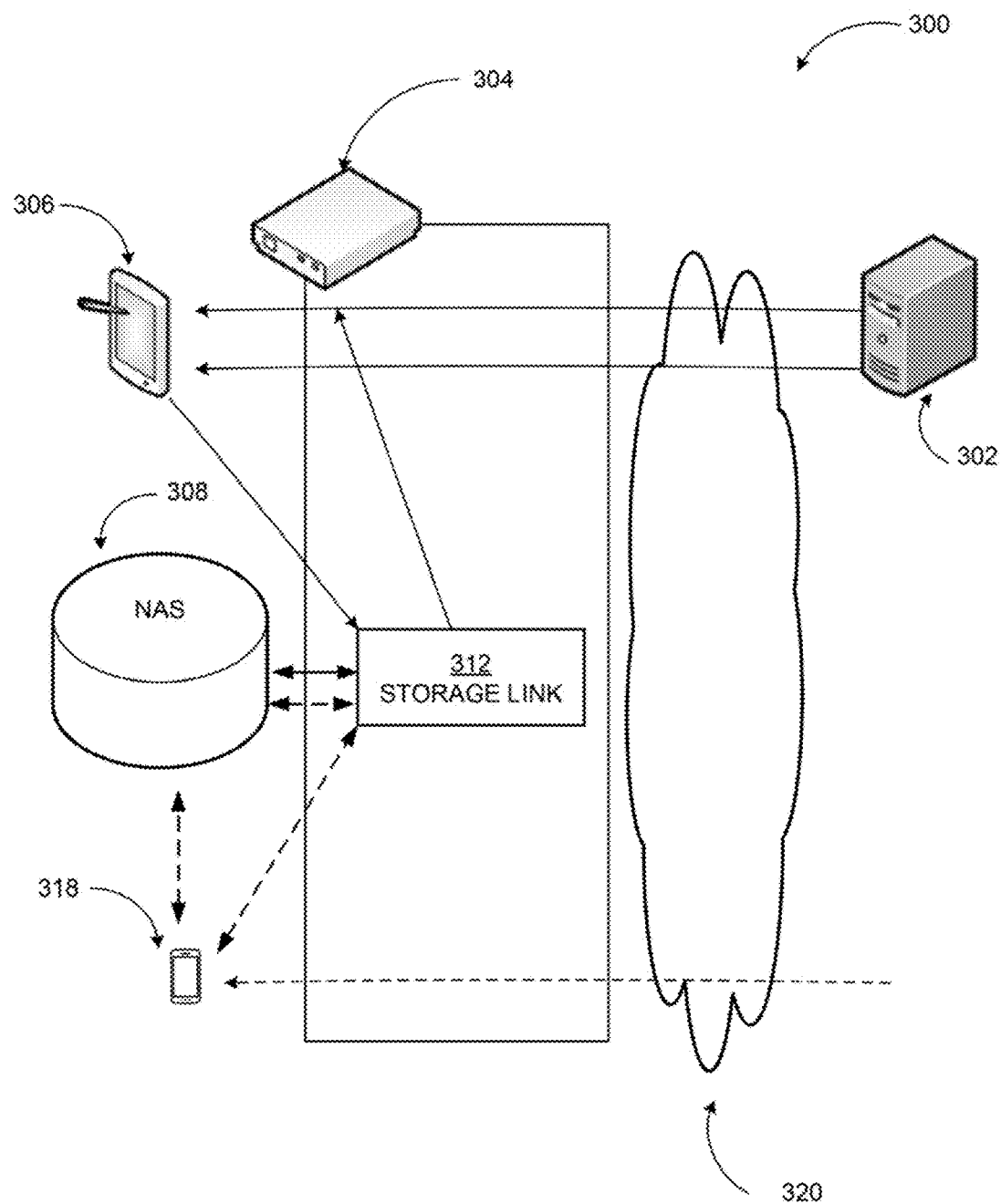
FIG. 3 illustrates another example system to redirect local storage for embedded applications.

FIG. 3 illustrates another example system to redirect local storage for embedded applications, arranged in accordance with at least some embodiments described herein.

As discussed previously in FIG. 2, the example system may include a server 302, a computing device e.g., redirection router 304), a device (e.g., tablet 306), and network-attached storage 308 within a network 320. As shown in a diagram 300, the example system may also include one or more other devices, such as a smart phone 318, which have received and downloaded the application replaced with a reference previously.

In one embodiment, the redirection router 304 may detect an activation of the smartphone 318 or an activation attempt of an application on the smartphone 318. The redirection router 304 may be able to detect the one or more activations through the network-attached storage link 312 accessible to the smartphone 318 and the redirection router 304. The application may normally be retrieved from the server 302 upon receiving a request from the smartphone 318. However, in response to the detected activation, the smartphone 318 may retrieve one or more portions of the application stored in the network-attached storage 308 based on the replaced links in the requests for the application or portions of the application. In yet other examples, the portions of the application may be retrieved and delivered by the redirection router 304 transparent to the smartphone 318 and to the server 302.

Increasingly, applications may be broadly disseminated. For example, health tracking and behavior tracking applications may often be run by installing an application on as many home devices as possible. The devices with the installed application may then send messages to a central coordinator to build a profile of a user's activities. The process may involve a number of application installs per user to cover appliances, lighting, home motion detectors, and the like. Each of these devices may have limited local storage, for example storing only a few internet addresses to activate and retrieve the application upon activation of the devices.

To disseminate an application that may run on hundreds, thousands, or millions of devices, it may be undesirable and/or untenable for the application to reload libraries and content from one or more central servers every time the devices activate. Millions of additional downloads may need to be created, congesting the central servers and the network associated with the server(s). Example embodiments for redirection of local storage may relieve the burden on the server(s) and associated network by simulating local storage on the network as discussed in conjunction with the FIGS. 1 through 3.

FIGS. 1 through 3 have been described using specific systems, devices, and processes for redirecting local storage in embedded applications. Embodiments for redirecting local storage in embedded applications are not limited to the specific system, devices, and processes according to these examples.

Figure 4:
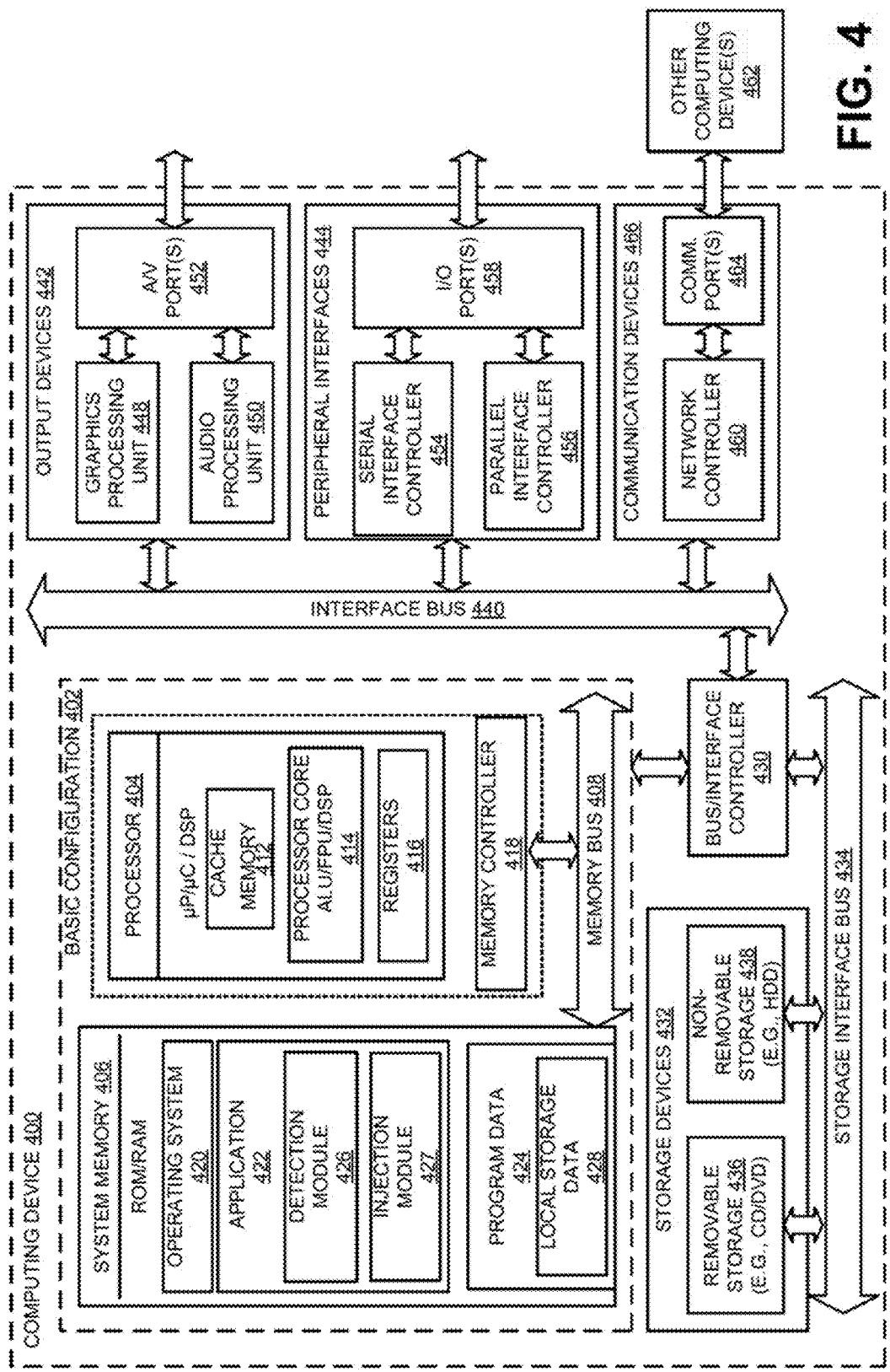
FIG. 4 illustrates a general purpose computing device, which may be used to redirect local storage for embedded applications.

FIG. 4 illustrates a general purpose computing device, which may be used to redirect local storage for embedded applications, arranged in accordance with at least some embodiments described herein.

For example, the computing device 400 may be used as a server, desktop computer, portable computer, smart phone, special purpose computer, or similar device such as a controller, anew component, a cluster of existing components in an operational system including a vehicle and a smart dwelling. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a cache memory 412, one or more processor cores 414, and registers 416. The example processor cores 414 may (each) include an arithmetic logic unit (ALU), a floating point unit (FPU), a digital signal processing core (DSP Core), or any combination thereof. An example memory controller 418 may also be used with the processor 404, or in some implementation the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The application 422 may include a detection module 426 and an injection module 427, which may be integral parts of the application 422 or separate applications on their own. The detection module 426 may detect a request for an application being delivered from a server. The injection module 427 may replace a reference to the client-side storage associated with the application with a network-attached storage link directed to network-attached storage. The injection module may also inject a cross origin resource sharing (CORS) update into the application, The program data 424 may include, among other data, local storage data 428 related to content of an application stored transparently within the network-attached storage, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 442, one or more peripheral interfaces 444, and one or more communication devices 466) to the basic configuration 402 via the bus/interface controller 430, Some of the example output devices 442 include a graphics processing unit 448 and an audio processing unit 450, which may be configured to communicate to various external devices such as a display or speakers via one or more AN ports 452. One or more example peripheral interfaces 444 may include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By Way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods for redirecting local storage for embedded applications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 5:
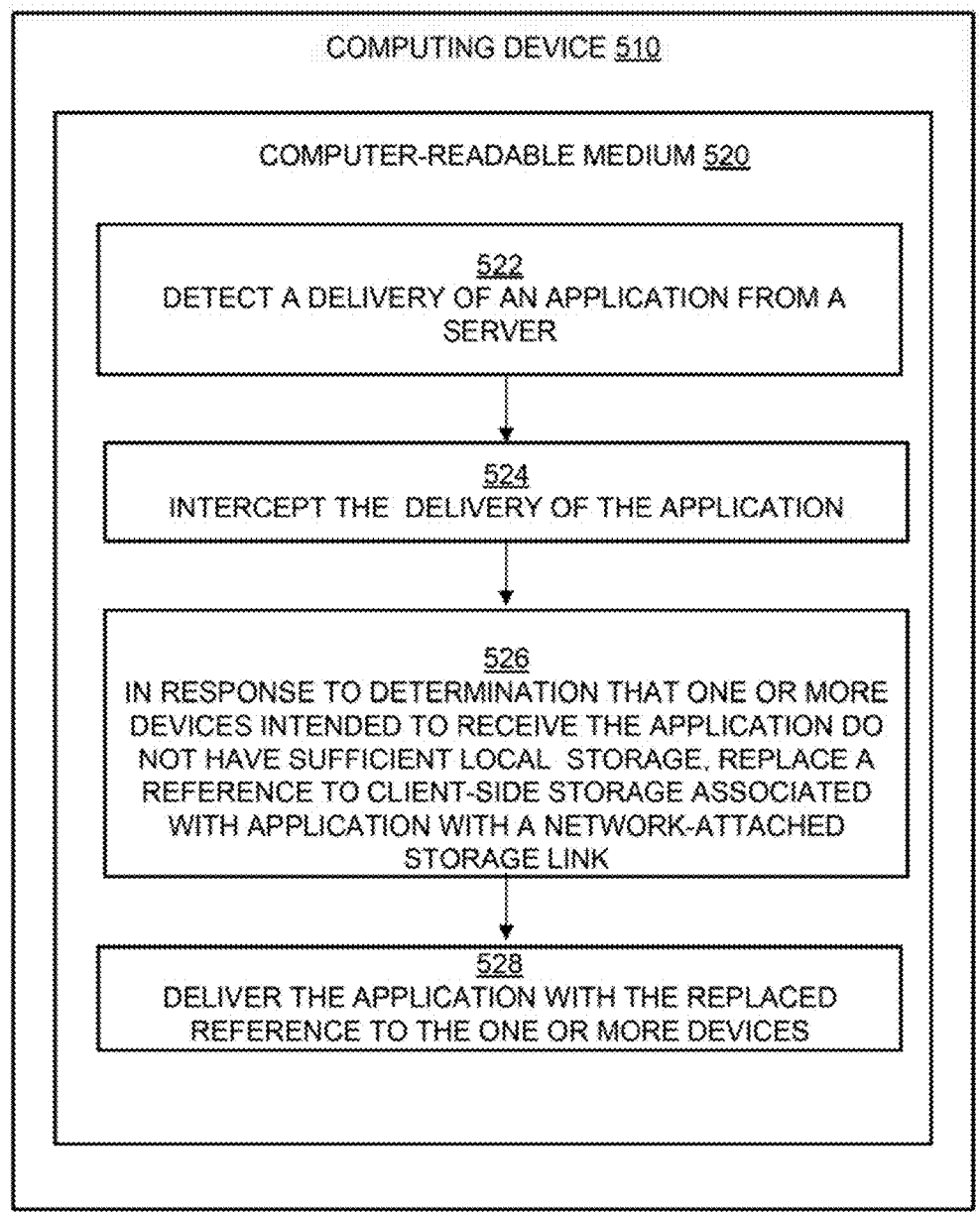
FIG. 5 is a flow diagram illustrating an example method to redirect local storage for embedded applications that may be performed by a computing device such as the computing device in FIG. 4.

FIG. 5 is a flow diagram illustrating an example method to redirect local storage for embedded applications that may be performed by a computing device such as the computing device in 4, arranged in accordance with at least some embodiments described herein.

Example methods may include one or more operations, functions or actions as illustrated by one or more of blocks 522, 524, 526, and/or 528. The operations described in the blocks 522 through 528 may also be stored as computer-executable instructions in a computer-readable medium such as a computer-readable medium 520 of a computing device 510.

An example process to redirect local storage for embedded applications may begin with block 522, "DETECT A DELIVERY OF AN APPLICATION FROM A SERVER," where a computing device may detect the delivery of an application from a server to a ubicomp device. The delivery may or may not be upon request by the device. The computing device may be a router, a server, a gateway, a client device, or other similar device.

Block 522 may be followed by block 524, "INTERCEPT THE DELIVERY OF THE APPLICATION," where the computing device may intercept the application being delivered from the server.

Block 524 may be followed by block 526, "IN RESPONSE TO DETERMINATION THAT ONE OR MORE DEVICES INTENDED TO RECEIVE THE APPLICATION DO NOT HAVE SUFFICIENT LOCAL STORAGE, REPLACE A REFERENCE TO CLIENT-SIDE STORAGE ASSOCIATED WITH THE APPLICATION WITH A NETWORK-ATTACHED STORAGE LINK," where the computing device may determine if the devices intended to receive the application have sufficient local storage. Sufficient local storage may be defined as a particular amount of storage and/or nonvolatile memory that enables the devices to store one or more portions of the application without having to re-download the portions of the application upon start-up of the device and/or activation of the application. If the devices have sufficient local storage, the computing device may deliver the application to the devices. If the devices do not have sufficient local storage, the computing device may remove a reference to the client-side storage associated with the application and replace the reference with a network-attached storage link directed to network-attached storage. The device may further inject a cross origin resource sharing (CORS) update into the application.

Block 526 may be followed by block 528, "DELIVER THE APPLICATION WITH THE REPLACED REFERENCE TO THE ONE OR MORE DEVICES," where the computing device may deliver the application with the replaced reference to the devices.

The blocks included in the above described process are for illustration purposes. Redirecting local storage for embedded applications may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 6:
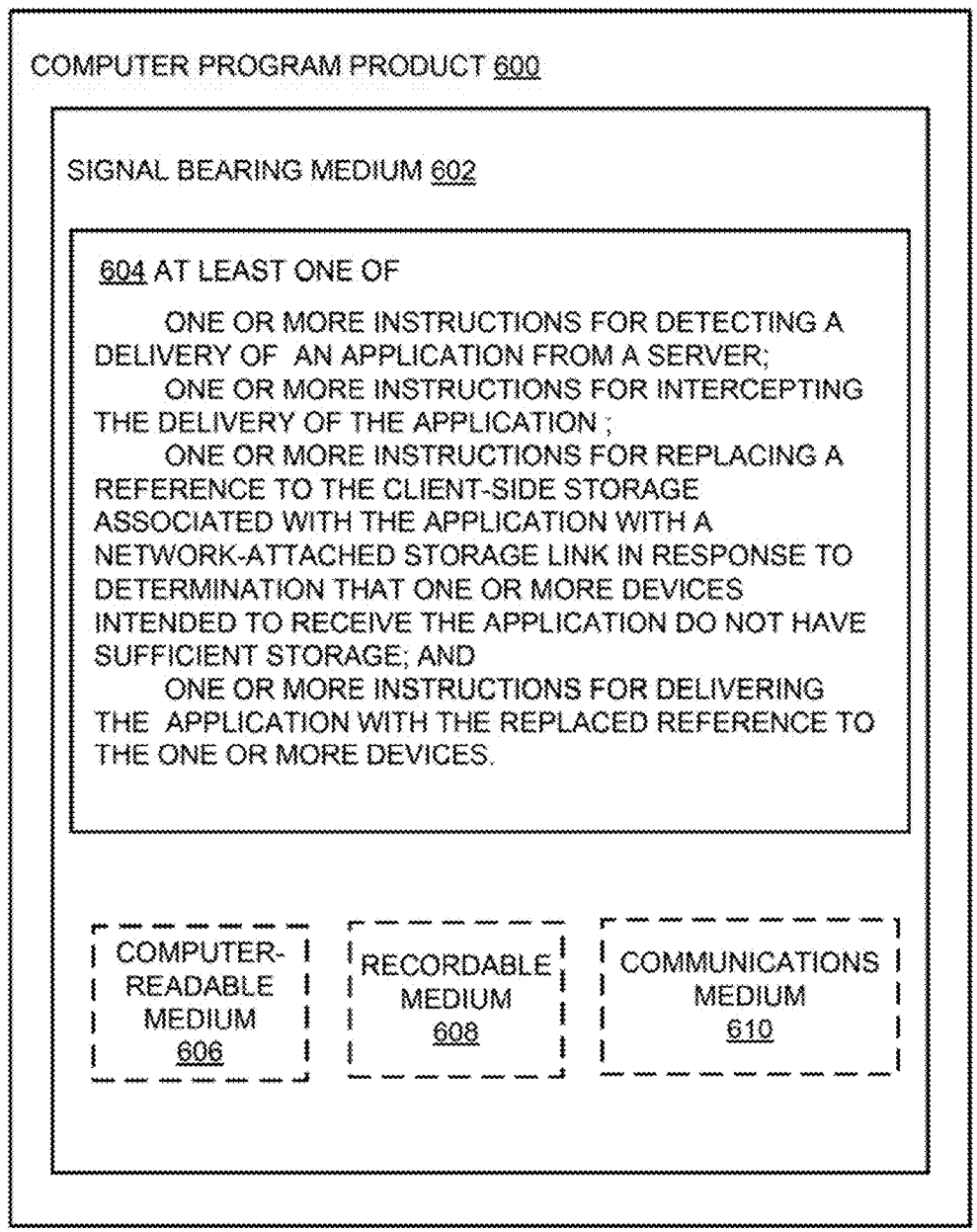
FIG. 6 illustrates a block diagram of an example computer program product, all arranged in accordance with at least some embodiments described herein.
Figure 2:
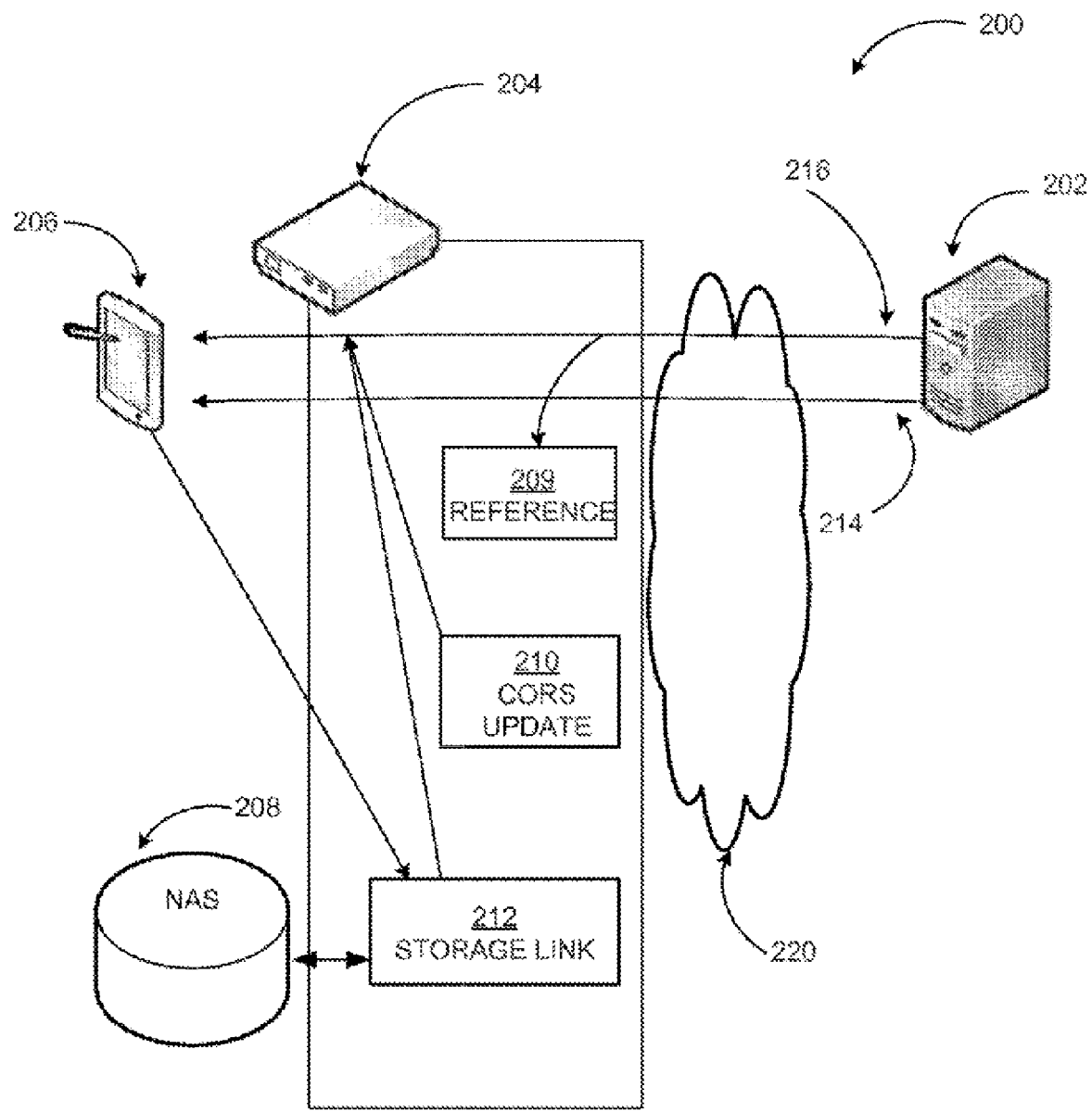

FIG. 6 illustrates a block diagram of an example computer program product, arranged in accordance with at least some embodiments described herein.

In some embodiments, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, a detection module 426 and an injection module 427 executed on the processor 404 may undertake one or more of the tasks shown in FIG. 6 in response to the instructions 604 conveyed to the processor 404 by the signal bearing medium 602 to perform actions associated with establishing secure communications to manage components of a control system as described herein. Some of those instructions may include, for example, instructions for detecting a delivery of an application from a server, intercepting the delivery of the application, replacing a reference to the client-side storage associated with the application with a network-attached storage link in response to determination that one or more devices intended to receive the application do not have sufficient storage, and delivering the application with the replaced reference to the one or more devices, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the computer program product 600 may be conveyed to one or more modules of the processor 404 of FIG. 4 by an RF signal bearing medium, where the signal bearing medium 602 is conveyed by the wireless communications medium 610 (e.g., a wireless communications medium conforming with the IEEE 802.11 standard).

According to some examples, methods are provided to redirect local storage for embedded applications. An example method may include one or more of detecting a delivery of an application from a server, intercepting the delivery of the application, and replacing a reference to the client-side storage associated with the application with a network-attached storage link in response to a determination that one or more devices intended to receive the application do not have sufficient local storage. The method may also include delivering the application with the replaced reference to the one or more devices.

According to other examples, the method may further include determining whether sufficient local storage is available on the one or more devices intended to receive the application. Determining whether sufficient local storage is available may include referencing a catalog or a table displaying advertised identifications and services of a plurality of devices. Determining whether sufficient local storage is available may further include observing the one or more devices throughout a plurality of application downloads to determine if the one or more devices re-download application content including a request for client-side storage, and resetting an application session to Observe if application content of the one or more devices has to re-download.

According to further examples, the method may also include delivering the application to the one or more devices in response to a determination that the one or more devices intended to receive the application have sufficient local storage, removing the reference to the client-side storage associated with the application prior to replacing the reference with the network-attached storage link, and/or injecting the application with a cross origin resource sharing (CORS) update prior to delivering the application. The method may further include intercepting a request from a device to receive the application from the server, retrieving one or more portions of the application stored in network-attached storage, and delivering the requested application to the device.

According to other examples, a computing device to redirect local storage for embedded applications is described. An example computing device may include a memory and a processor coupled to the memory. The processor may detect a delivery of an application from a server, intercept the delivery of the application, replace a reference to the client-side storage associated with the application with a network-attached storage link in response to a determination that one or more devices intended to receive the application do not have sufficient local storage, and deliver the application with the replaced reference to the one or more devices.

According to some examples, the computing device may be a router, a server, a gateway, and/or a client device. The computing device may be configured to manage local storage for delivered applications for multiple devices. The devices may be associated with one or more of a home, a business, and an enterprise. The computing device may be coupled to network-attached storage. The processor may also determine if sufficient local storage is available on the one or more devices intended to receive the application. The processor may remove the reference to the client-side storage associated with the application prior to replacement of the reference with the network-attached storage link. The processor may also inject the application with a cross origin resource sharing (CORS) update prior to delivery of the application to the one or more devices.

According to yet other examples, the processor may further intercept a request from a device to receive the application from the server, retrieve one or more portions of the application stored in network-attached storage, and deliver the requested application to the device. The processor may also detect one of an activation of a device or an activation attempt of the application on the device, retrieve one or more portions of the application stored in the network-attached storage, and deliver the application to the device. The retrieval and delivery of the application from the network-attached storage to the device may be transparent to the device.

According to further examples, systems to redirect local storage for embedded applications are described. An example system may include a server coupled to one or more devices configured to deliver an application and/or a content to the devices, and a redirection router. The redirection router may detect a delivery of an application from a server, intercept the delivery of the application, replace a reference to the client-side storage associated with the application with a network-attached storage link in response to a determination that one or more devices intended to receive the application do not have sufficient local storage, and deliver the application with the replaced reference to the one or more devices.

According to further examples, the redirection router may intercept a request from a device to receive the application from the server, retrieve one or more portions of the application stored in network-attached storage, and deliver the requested application to the device. The redirection router may also detect one of an activation of a device or an activation attempt of the application on the device, retrieve one or more portions of the application stored in the network-attached storage, and deliver the application to the device. The retrieval and delivery of the application from the network-attached storage to the device may be transparent to the device.

According to some examples, the network-attached storage may be a device capable of storing one or more portions of the application in response to a request from the redirection router to store the one or more portions of the application and servicing out the one or more portions of the application in response to a request from the redirection router to retrieve the one or more portions of the application stored in the network-attached storage. The redirection router may be one or more of a home router, an Internet Service Provider (ISP) router, a company router, and an enterprise router. The redirection router may also determine if sufficient local storage is available on the one or more devices intended to receive the application.

According to other examples, the redirection router may deliver the application to the one or more devices in response to a determination that the one or more devices intended to receive the application have sufficient local storage, remove the reference to the client-side storage associated with the application prior to replacement of the reference with the network-attached storage link, and/or inject the application with a cross origin resource sharing (CORS) update prior to delivery of the application to the one or more devices. The network-attached storage link may be a hard link or a soft link to network-attached storage. The soft link to the network-attached storage may enable at least a portion of the application stored at the network-attached storage to be duplicated and stored at one or more other devices proximal to the network-attached storage.

According to some embodiments, a computer-readable memory device with instructions stored thereon is described, which when executed on one or more computing devices may execute a method to redirect local storage for embedded applications. The method may be similar to the methods provided above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented utilizing any suitable commercially available components, such as those typically found in local storage systems within networked environments. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together A. and C together B and C together, and/or A, B, and C together etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

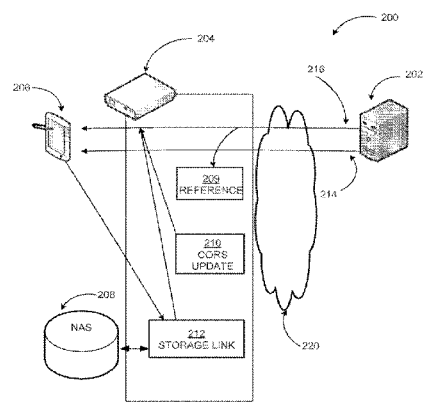

What is claimed is:

1. A method to redirect local storage for embedded applications, the method comprising:
   detecting a delivery of an application from a server;
   intercepting the delivery of the application;
   determining whether sufficient local storage is available on one or more devices intended to receive the application;
   in response to a determination that the one or more devices intended to receive the application do not have sufficient local storage, replacing a reference to client-side storage associated with the application with a network-attached storage link;
   delivering the application with the replaced reference to the one or more devices;
   detecting subsequent requests from the one or more devices to receive the application or portions of the application from the server;
   automatically directing the subsequent requests to network-attached storage through the network-attached storage link to retrieve the application or the portions of the application without connecting to the server; and
   delivering the retrieved application or the portions of the application from the network-attached storage to the one or more devices through the network-attached storage link, wherein retrieval and delivery of the application and the portions of the application is transparent to the one or more devices and the server.

2. The method of claim 1, wherein determining whether sufficient local storage is available further comprises:
   referencing one of a catalog and a table displaying advertised identifications and services of a plurality of devices.

3. The method of claim 1, wherein determining whether sufficient local storage is available further comprises:
   observing the one or more devices throughout a plurality of application downloads to determine if the one or more devices re-dovimload application content including a request for client-side storage.

4. The method of claim 1, wherein determining whether sufficient local storage is available further comprises:
   resetting an application session to observe if application content of the one or more devices has to re-download.

5. The method of claim 1, further comprising:
   removing the reference to the client-side storage associated with the application prior to replacing the reference with the network-attached storage link.

6. A computing device coupled to network-attached storage to redirect local storage for embedded applications, wherein the computing device is configured to manage local storage for delivered applications for a plurality of devices, the computing device comprising:
   a memory;
   a processor coupled to the memory, wherein the processor is configured to:
   detect a delivery of an application from a server;
   intercept the delivery of the application;
   determine whether sufficient local storage is available on the one or more devices intended to receive the application;
   in response to a determination that the one or more devices intended to receive the application have sufficient local storage, deliver the application to the one or more devices;
   in response to a determination that one or more devices intended to receive the application do not have sufficient local storage, replace a reference to client-side storage associated with the application with a network-attached storage link;
   deliver the application with the replaced reference to the one or more devices:
   detect subsequent requests from the one or more devices to receive the application or portions of the application from the server;
   automatically direct the subsequent requests to network-attached storage through the network-attached storage link to retrieve the application or the portions of the application without connecting to the server; and
   deliver the retrieved application or the portions of the application from the network-attached storage to the one or more devices through the network-attached storage link, wherein retrieval and delivery of the application and the portions of the application is transparent to the one or more devices and the server.

7. The computing device of claim 6, wherein the processor is further configured to remove the reference to the client-side storage associated with the application prior to replacement of the reference with the network-attached storage link.

8. The computing device of claim 6, wherein the processor is further configured to:
   detect one of an activation of a device or an activation attempt of the application on the device;
   retrieve one or more portions of the application stored in the network-attached storage; and
   deliver the application to the device.

9. A system to redirect local storage for embedded applications, the system comprising:

a server, coupled to one or more devices, configured to deliver at least one of an application and a content to the one or more devices;
a redirection router comprising:
    a communication interface configured to communicate with the one or more devices;
    a memory implemented in an integrated circuit (IC) configured to store instructions; and
    processor implemented in an integrated circuit IC coupled to the memory and the communication interface, wherein the processor is configured to:
    detect a delivery of an application from the server;
    intercept the delivery of the application;
    determine whether sufficient local storage is available on the one or more devices intended to receive the application;
    in response to a determination that one or more devices intended to receive the application do not have sufficient local storage, replace a reference to client-side storage associated with the application with a network-attached storage link;
    inject the application with a cross origin resource sharing (CORS) update prior to delivery of the application to the one or more devices;
    deliver the application with the replaced reference to the one or more devices;
    detect subsequent requests from the one or more devices to receive the application or portions of the application from the server;
    automatically direct the subsequent requests to network-attached storage through the network-attached storage link to retrieve the application or the portions of the application without connecting to the server; and
    deliver the retrieved application or the portions of the application from the network-attached storage to the one or more devices through the network-attached storage link, wherein retrieval and delivery of the application and the portions of the application is transparent to the one or more devices and the server.

10. The system of claim 9, wherein the processor is further configured to:
    detect one of an activation of a device or an activation attempt of the application on the device;
    retrieve one or more portions of the application stored in the network-attached storage; and
    deliver the application to the device.

11. The system of claim 9, wherein the network-attached storage is a device capable of storing one or more portions of the application in response to a request from the redirection router to store the one or more portions of the application and servicing out the one or more portions of the application in response to a request from the redirection router to retrieve the one or more portions of the application stored in the network-attached storage.

12. The system of claim 9, wherein the processor is further configured to deliver the application to the one or more devices in response to a determination that the one or more devices intended to receive the application have sufficient local storage.

13. The system of claim 9, wherein the processor is further configured to remove the reference to the client-side storage associated with the application prior to replacement of the reference with the network-attached storage link.

14. The system of claim 9, wherein the network-attached storage link is one of a hard link and a soft link to network-attached storage.

15. The system of claim 14, wherein the soft link to the network-attached storage enables at least a portion of the application stored at the network-attached storage to be duplicated and stored at one or more other devices proximal to the network-attached storage.

* * * * *

UNITED STATES PATENT AND TRADEMARK OFFICE
CERTIFICATE OF CORRECTION

PATENT NO. : 9,549,036 B2
APPLICATION NO. : 14/376133
DATED : January 17, 2017
INVENTOR(S) : Kruglick Page 1 of 4

It is certified that error appears in the above-identified patent and that said Letters Patent is hereby corrected as shown below:

On the Title Page

Delete the title page and substitute therefor with the attached title page consisting of the corrected illustrative figure.

In item (57), under "ABSTRACT", in Column 2, Line 13, delete "link, to the" and insert -- link to the --, therefor.

In the Drawings

Please replace FIG. 2 with FIG. 2 as shown on the attached page.

In the Specification

In Column 1, Line 9, delete "§371" and insert -- § 371 --, therefor.

In Column 3, Line 7, delete "herein, it" and insert -- herein. It --, therefor.

In Column 3, Line 18, delete "In sonic" and insert -- In some --, therefor.

In Column 6, Line 32, delete "net-work-attached" and insert -- network-attached --, therefor.

In Column 8, Line 10, delete "device e.g.," and insert -- device (e.g., --, therefor.

In Column 8, Line 47, delete "reload libraries" and insert -- reload all libraries --, therefor.

In Column 9, Line 2, delete "anew" and insert -- a new --, therefor.

In Column 9, Line 39, delete "application, The" and insert -- application. The --, therefor.

Signed and Sealed this
Twenty-fifth Day of April, 2017

Michelle K. Lee
*Director of the United States Patent and Trademark Office*

CERTIFICATE OF CORRECTION (continued)

In Column 10, Line 14, delete "430, Some" and insert -- 430. Some --, therefor.

In Column 10, Line 18, delete "AN ports 452." and insert -- A/V ports 452. --, therefor.

In Column 10, Line 40, delete "By Way" and insert -- By way --, therefor.

In Column 11, Line 4, delete "in 4," and insert -- in FIG. 4, --, therefor.

In Column 12, Line 61, delete "to Observe" and insert -- to observe --, therefor.

In Column 17, Line 1, delete "together A. and C together B" and insert -- together, A and C together, B --, therefor.

In Column 17, Line 2, delete "together etc.)." and insert -- together, etc.). --, therefor.

In Column 17, Line 8, delete "B" be understood" and insert -- B" will be understood --, therefor.

In the Claims

In Column 18, Line 5, in Claim 3, delete "re-dovimload" and insert -- re-download --, therefor.

In Column 18, Line 39, in Claim 6, delete "devices:" and insert -- devices; --, therefor.

In Column 19, Lines 8-9, in Claim 9, delete "and processor" and insert -- and a processor --, therefor.

In Column 19, Line 9, in Claim 9, delete "circuit IC" and insert -- circuit (IC) --, therefor.

(12) United States Patent
Kruglick

(10) Patent No.: US 9,549,036 B2
(45) Date of Patent: Jan. 17, 2017

(54) NETWORK INJECTED STORAGE REDIRECTION FOR EMBEDDED APPLICATIONS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 219 days.

(21) Appl. No.: 14/376,133

(22) PCT Filed: Nov. 20, 2013

(86) PCT No.: PCT/US2013/070980
§ 371 (c)(1),
(2) Date: Jul. 31, 2014

(87) PCT Pub. No.: WO2015/076794
PCT Pub. Date: May 28, 2015

(65) Prior Publication Data
US 2016/0080515 A1    Mar. 17, 2016

(51) Int. Cl.
G06F 9/445 (2006.01)
H04L 29/08 (2006.01)
G06F 3/06 (2006.01)

(52) U.S. Cl.
CPC ........ *H04L 67/2819* (2013.01); *G06F 3/0604* (2013.01); *G06F 3/0607* (2013.01);
(Continued)

(58) Field of Classification Search
USPC .......... 717/174, 175, 169; 455/3.06, 414.1; 707/784, 692; 713/1; 709/203
See application file for complete search history.

(56) References Cited

U.S. PATENT DOCUMENTS

2003/0041323 A1* 2/2003 Plummer .............. G06F 8/65
  717/169
2010/0011351 A1* 1/2010 Tsvi ................ G06F 3/0607
  717/174
(Continued)

OTHER PUBLICATIONS

"'Intelligent' embedded devices will be driven by Java, say analysis," Accessed at http://web.archive.org/web/20130922064602/http://jaxenter.com/intelligent-embedded-devices-will-be-driven-by-java-say-analysis-45593.html, Accessed on Jul. 28, 2014, pp. 3.
(Continued)

*Primary Examiner* — Kyung H Shin
(74) *Attorney, Agent, or Firm* — Turk IP Law, LLC

(57) ABSTRACT

Technologies are generally described to redirect local storage for embedded applications. In some examples, a computing device such as a redirection router, coupled to network-attached storage, may detect a request for an application being delivered from a server to a destination device such as a ubicomp device and intercept the requested application. The redirection router may determine whether the destination device has sufficient local storage. In response to determination that the destination device does not have sufficient local storage or a predefined configuration such as requesting device being configured for local storage, a reference to the client-side storage associated with the application may be replaced with a link to the network-attached storage prior to delivery of the application. Subsequent retrievals of the application or portions thereof may be from the network-attached storage directly or via the redirection router.

15 Claims, 6 Drawing Sheets